(12) United States Patent
Shreevastav et al.

(10) Patent No.: US 11,838,953 B2
(45) Date of Patent: Dec. 5, 2023

(54) METHODS PROVIDING EARLY REDIRECTION IN WIRELESS DEVICES

(71) Applicant: Telefonaktiebolaget LM Ericsson (publ), Stockholm (SE)

(72) Inventors: Ritesh Shreevastav, Upplands Väsby (SE); Andreas Höglund, Solna (SE); Yuhang Liu, Lund (SE); Yutao Sui, Solna (SE); Tuomas Tirronen, Helsinki (FI); Emre Yavuz, Stockholm (SE)

(73) Assignee: Telefonaktiebolagget LM Ericsson (Publ), Stockholm (SE)

( * ) Notice: Subject to any disclaimer, the term of this patent is extended or adjusted under 35 U.S.C. 154(b) by 127 days.

(21) Appl. No.: 17/041,785

(22) PCT Filed: Mar. 26, 2019

(86) PCT No.: PCT/EP2019/057513
§ 371 (c)(1),
(2) Date: Sep. 25, 2020

(87) PCT Pub. No.: WO2019/185588
PCT Pub. Date: Oct. 3, 2019

(65) Prior Publication Data
US 2021/0045161 A1   Feb. 11, 2021

Related U.S. Application Data

(60) Provisional application No. 62/648,610, filed on Mar. 27, 2018.

(51) Int. Cl.
*H04W 74/08* (2009.01)
*H04W 72/0453* (2023.01)
(Continued)

(52) U.S. Cl.
CPC ... *H04W 74/0833* (2013.01); *H04W 72/0453* (2013.01); *H04W 72/1263* (2013.01); *H04W 72/23* (2023.01); *H04W 74/004* (2013.01)

(58) Field of Classification Search
None
See application file for complete search history.

(56) References Cited

U.S. PATENT DOCUMENTS 10,721,775 B2 * 7/2020 Park ................ H04W 74/0833
10,779,333 B2 * 9/2020 Ye .................. H04W 74/0833
(Continued)

OTHER PUBLICATIONS

U.S. Appl. No. 62/564,919, filed Sep. 28, 2017, Ye et al., "Design of Early Data Transmission for EFEMTC and FENB-IOT".*
(Continued)

*Primary Examiner* — Gregory B Sefcheck
(74) *Attorney, Agent, or Firm* — Christopher & Weisberg, P.A.

(57) ABSTRACT

The invention refers to a method of operating a wireless device, UE, configured to provide communication over a radio interface with a wireless communication network, the method including transmitting a random access, RA, preamble of an RA procedure to the wireless communication network using a first uplink carrier; and after transmitting the RA preamble of the RA procedure, receiving a Random Access Response, RAR, of the RA procedure from the wireless communication network, wherein the RAR includes an indication to use a second uplink carrier different than the first uplink carrier; the invention further refers to a method of operating a base station of a wireless communication network configured to provide communication over a radio interface with a wireless device, UE, the method including receiving a random access, RA, preamble of an RA procedure from the wireless device using a first uplink carrier.

12 Claims, 13 Drawing Sheets

(51) Int. Cl.
  *H04W 72/1263* (2023.01)
  *H04W 72/23* (2023.01)
  *H04W 74/00* (2009.01)

(56) References Cited

U.S. PATENT DOCUMENTS

| | | | |
|---|---|---|---|
| 10,887,922 B2* | 1/2021 | Kim | H04W 88/10 |
| 11,102,764 B2* | 8/2021 | Shrestha | H04W 74/0833 |
| 11,218,272 B2* | 1/2022 | Yu | H04L 5/005 |
| 11,259,337 B2* | 2/2022 | Park | H04W 74/0833 |
| 11,350,445 B2* | 5/2022 | Fujishiro | H04W 72/0413 |
| 11,382,137 B2* | 7/2022 | Höglund | H04W 8/24 |
| 11,382,140 B2* | 7/2022 | Ye | H04L 5/0091 |
| 2010/0238859 A1* | 9/2010 | Vukovic | H04W 74/0833 370/328 |
| 2010/0278128 A1 | 11/2010 | Lee et al. | |
| 2011/0249641 A1 | 10/2011 | Kwon et al. | |
| 2011/0317777 A1 | 12/2011 | Huang et al. | |
| 2012/0287865 A1* | 11/2012 | Wu | H04W 74/006 370/329 |
| 2017/0034853 A1* | 2/2017 | Rune | H04W 52/0216 |
| 2017/0135134 A1* | 5/2017 | Rune | H04W 74/0833 |
| 2017/0202053 A1* | 7/2017 | Rune | H04W 76/25 |
| 2018/0206290 A1* | 7/2018 | Dai | H04W 76/27 |
| 2019/0045554 A1* | 2/2019 | Ye | H04W 74/0833 |
| 2019/0159197 A1* | 5/2019 | Shrestha | H04W 74/0866 |
| 2019/0215872 A1* | 7/2019 | Park | H04W 74/0833 |
| 2020/0037368 A1* | 1/2020 | Höglund | H04W 72/23 |
| 2020/0187242 A1* | 6/2020 | Höglund | H04W 52/365 |
| 2020/0187245 A1* | 6/2020 | Fujishiro | H04W 74/0833 |
| 2020/0245362 A1* | 7/2020 | Höglund | H04W 74/0833 |
| 2021/0112590 A1* | 4/2021 | Kim | H04W 74/008 |
| 2022/0256587 A1* | 8/2022 | Fujishiro | H04W 74/002 |

OTHER PUBLICATIONS

U.S. Appl. No. 62/586,718, filed Nov. 15, 2017, Ye et al., "Design of Early Data Transmission for EFEMTC and FENB-IOT".*
International Search Report and Written Opinion of the International Searching Authority, PCT/EP2019/057513, dated May 17, 2019, 10 pages.
"NB-IoT Load Distribution Discussion," 3GPP TSG-RAN WG2 NB-IoT #93, St. Julian's, Malta, Feb. 15-19, 2016, R2-161136 (XP051055120) ZTE, Agenda Item 7.16.2.3, 6 pages.
"Revised WID on Further NB-IoT enhancements," 3GPP TSG RAN Meeting #77, Sapporo, Japan, Sep. 11-14, 2017, RP-172063, Huawei, HiSilicon, Agenda Item 10.6.14, 6 pages.
3rd Generation Partnership Project; Technical Specification Group Radio Access Network; Evolved Universal Terrestrial Radio Access (E-UTRA); User Equipment (UE) radio transmission and reception (Release 15), 3GPP TS 36.101, V15.1.0 (Dec. 2017), pp. 1-28.
3rd Generation Partnership Project; Technical Specification Group Radio Access Network; Evolved Universal Terrestrial Radio Access (E-UTRA); User Equipment (UE) radio transmission and reception (Release 15), 3GPP TS 36.101, V15.1.0 (Dec. 2017), pp. 29-515.
3rd Generation Partnership Project; Technical Specification Group Radio Access Network; Evolved Universal Terrestrial Radio Access (E-UTRA); User Equipment (UE) radio transmission and reception (Release 15), 3GPP TS 36.101, V15.1.0 (Dec. 2017), pp. 515-1289.
3rd Generation Partnership Project; Technical Specification Group Radio Access Network; Evolved Universal Terrestrial Radio Access (E-UTRA); User Equipment (UE) radio transmission and reception (Release 15), 3GPP TS 36.101, V15.1.0 (Dec. 2017), pp. 515-1147.
3rd Generation Partnership Project; Technical Specification Group Radio Access Network; Evolved Universal Terrestrial Radio Access (E-UTRA); Medium Access Control (MAC) protocol specification (Release 14); 3GPP TS 36.321 V14.4.0 (Sep. 2017), 108 pages.

* cited by examiner

FIG 3
E/T/R/R/BI MAC subheader
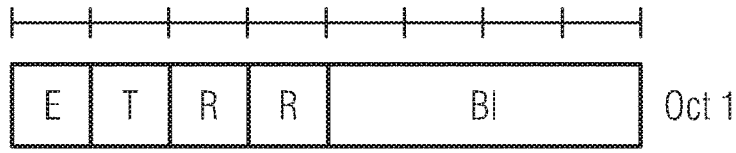
FIG 4
E/T/F/R/BI MAC subheader
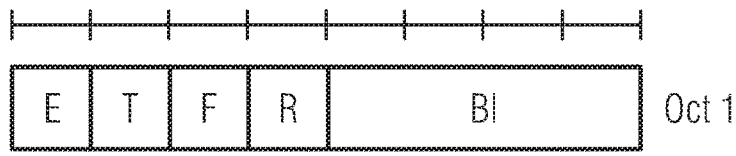
FIG 5
Backoff Parameter values
| Index | Backoff Parameter value [ms] |
|---|---|
| 0 | 0 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | Reserved |
| 14 | Reserved |
| 15 | Reserved |

Backoff Parameter values

| Index | Backoff Parameter value [ms] |
|---|---|
| 0 | 0 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | Redirection Flag |
| 14 | Reserved |
| 15 | Reserved |

MAC RAR for UL/DL Re-direction

MAC RAR with Re-direction FLAGs

MAC RAR for UL/DL Re-direction

FIG 10
Use of Multiple Reserved Bits For Redirection Case
| Bits | Indication |
|---|---|
| 00 | Legacy |
| 01 | Flag for redirection with continue |
| 10 | Flag for new UL/DL Carrier |
| 11 | Reserved |
FIG 11
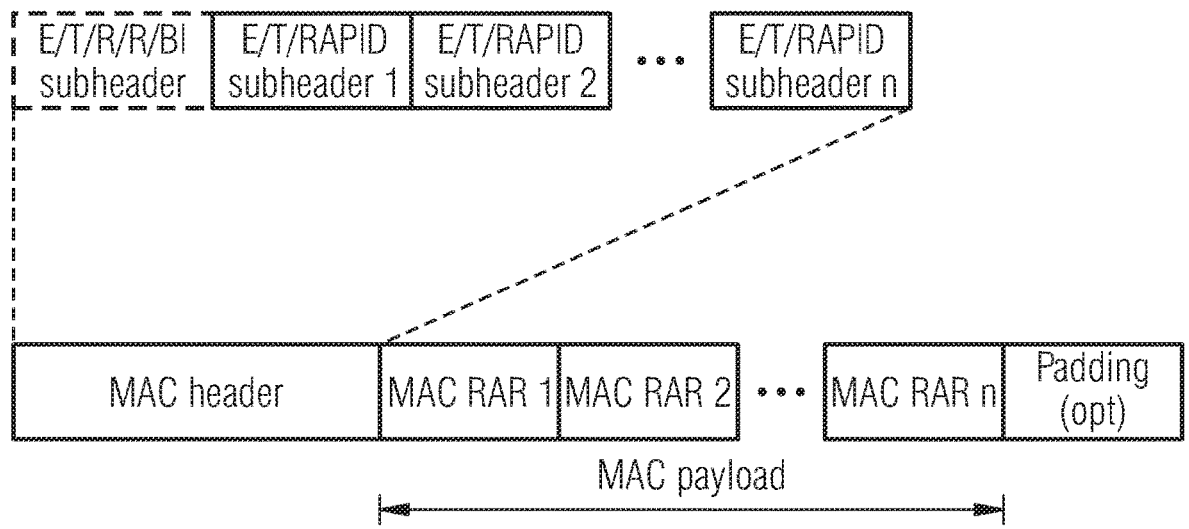
MAC PDU Including A MAC header and MAC RARs
FIG 12
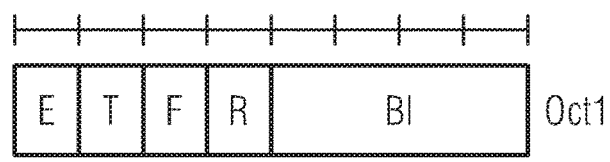
Subheader

METHODS PROVIDING EARLY REDIRECTION IN WIRELESS DEVICES

CROSS REFERENCE TO RELATED APPLICATIONS

This application is a 35 U.S.C. § 371 national stage application of PCT International Application No. PCT/EP2019/057513 filed on Mar. 26, 2019, which in turns claims domestic priority to U.S. Provisional Patent Application No. 62/648,610, filed on Mar. 27, 2018, the disclosures and content of which are incorporated by reference herein in their entirety.

TECHNICAL FIELD

The present disclosure relates generally to wireless communications and related wireless devices and network nodes, and more particularly to Internet-of-Things (IoT) devices and Machine-Type Communication (MTC) devices.

BACKGROUND

Narrow Band Internet-of-Things NB-IoT is a narrowband system being developed for cellular internet of things by 3GPP. The system may provide access to network services using physical layer adapted/optimized for very low power consumption (e.g., full carrier bandwidth may be 180 kHz, and subcarrier spacing may be 3.75 kHz or 15 kHz). The system is based on existing LTE systems and addresses adapted/optimized network architecture and/or improved indoor coverage for massive numbers of devices with the following characteristics:
  low throughput devices (e.g. 2 kbps)
  low delay sensitivity (~10 seconds)
  ultra-low device cost (below 5 dollars)
  low device power consumption (battery life of 10 years)
It is envisioned that each cell (~1 km2) in this system will serve thousands (~50 thousand) devices such as sensors, meters, actuators, and the like. To be able to make use of existing spectrum (e.g., for Global System for Mobile Communication GSM), a fairy narrow bandwidth has been adopted for NB-IoT technology.

Three different operation modes are defined (i.e., stand-alone, guard-band, and in-band). In stand-alone mode, the NB-IoT system is operated in dedicated frequency bands. For in-band operation, the NB-IoT system can be placed inside the frequency bands used by the current LTE system, while in the guard-band mode, the NB-IoT system can be placed in the guard band used by the current Long Term Evolution LTE system. The NB-IoT system can operate with a system bandwidth of 180 kHz. When multi-carriers are configured, several 180 kHz Physical Resource Blocks (PRBs) can be used (e.g., to increase the system capacity, inter-cell interference coordination, load balancing, etc.).

3GPP draft document RP-171180, titled "Even further enhanced MTC for LTE", provided by the same applicant, discusses early data transmission Power consumption, latency gain and necessary support for DL/UL data transmission on a dedicated resource during the RA procedure in the RRC Suspend/Resume case.

3GPP draft document RP-172063, titled "Revised WID on Further NB-IoT enhancements", discusses power consumption/latency gain, and necessary support for DL/UL data transmission on a dedicated resource during the RA procedure after NPRACH transmission and before the RRC connection setup is completed.

One of the agreements of previous 3GPP meetings is to support early UL data transmission in Msg3 and early DL data transmission in Msg4 for a Rel-13 User Plane UP solution. The messages in the Random Access, RA, procedure are commonly referred to as message 1 (Msg1) through message 4 (Msg4). From TS36.300, the contention based RA procedure is illustrated as in FIG. 1, where message 1 (msg1) is a Random Access Preamble transmitted in the uplink UL from the wireless device UE to the base station where message 1 (msg2) is a Random Access Response RAR transmitted in the downlink DL from the base station to the wireless device UE, where a Scheduled Transmission (msg3) is transmitted in the UL from the wireless device UE to the base station and where a Contention Resolution (msg4) is transmitted in the DL from the base station to the wireless device UE.

Early Data Transmission EDT may be enabled for UL Msg3 (Scheduled Transmission), or DL Msg4 (Contention Resolution), or both Msg3 and Msg4, depending on actual use cases.

The following agreements regarding preamble and PRACH resource partitioning/configuration and indication of Msg3 data sizes were made:
  The UE initiates EDT in Msg1 when the size of Msg3 including the user data, which UE intends to transmit, is equal or smaller than the maximum possible Transport Block Size TBS size for Msg3 broadcast per Coverage Enhancement CE.
  PRACH partitioning for EDT indication is configured per enhanced coverage level.

With an expectation for rapid increases in numbers of IoT devices, congestion on resources used for random access procedures may increase.

SUMMARY

It is an object of the present invention to improve a handling of a plurality of uplink carriers. This object is achieved by the independent claims. Advantageous embodiments are described in the dependent claims and by the following description.

In an embodiment, a random access RA preamble of an RA procedure is transmitted to the wireless communication network using a first uplink carrier. After transmitting the RA preamble of the RA procedure, a Random Access Response RAR of the RA procedure is being received from the wireless communication network, with the RAR including an indication to use a second uplink carrier different than the first uplink carrier.

In an embodiment, a random access RA preamble of an RA procedure is received from the wireless device using a first uplink carrier. Responsive to receiving the RA preamble of the RA procedure, a Random Access Response RAR of the RA procedure is transmitted to the wireless device, with the RAR including an indication to use a second uplink carrier different than the first uplink carrier.

In an embodiment, a wireless device, UE, comprises a transceiver configured to provide wireless network communication with a wireless communication network; and a processor coupled with the transceiver, wherein the processor is configured to provide wireless network communication through the transceiver, and wherein the processor is configured to transmitting a random access, RA, preamble of an RA procedure to the wireless communication network using a first uplink carrier; and after transmitting the RA preamble of the RA procedure, receiving a Random Access Response, RAR, of the RA procedure from the wireless communication network, wherein the RAR includes an indication to use a second uplink carrier different than the first uplink carrier.

In an embodiment, a base station, eNB or gNB, comprises a transceiver configured to provide wireless network communication with a wireless terminal; and a processor coupled with the transceiver, wherein the processor is configured to provide wireless network communications through the transceiver, and wherein the processor is configured to receiving a random access, RA, preamble of an RA procedure from the wireless device using a first uplink carrier; and responsive to receiving the RA preamble of the RA procedure, transmitting a Random Access Response, RAR, of the RA procedure to the wireless device, wherein the RAR includes an indication to use a second uplink carrier different than the first uplink carrier.

As advantages, by providing an indication to use a second uplink carrier to restart or continue an RA procedure (different than the uplink carrier used for an RA preamble to initiate the RA procedure), a speed of the RA procedure may be increased, for example, relative to using a back-off timer on the same uplink carrier. Moreover, load balancing across RA carriers/resources may be improved, and/or network performance may be improved.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings:

FIG. 3 illustrates a MAC subheader including a backoff parameter index;

FIG. 4 illustrates a MAC subheader including a flag to indicate redirection according to some embodiments of inventive concepts;

FIG. 5 is a table providing backoff parameter indices and corresponding backoff parameter values;

FIG. 10 is a table providing bits (indices) that may be used for two flag bits of FIG. 8 and corresponding indications for redirection according to some embodiments of inventive concepts;

FIG. 11 illustrates a MAC PDU including a MAC header and MAC RARs according to some embodiments of inventive concepts;

FIG. 12 illustrates a MAC subheader including a flag to indicate redirection, where the MAC subheader of FIG. 12 may be used in the MAC PDU of FIG. 11 according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 14:
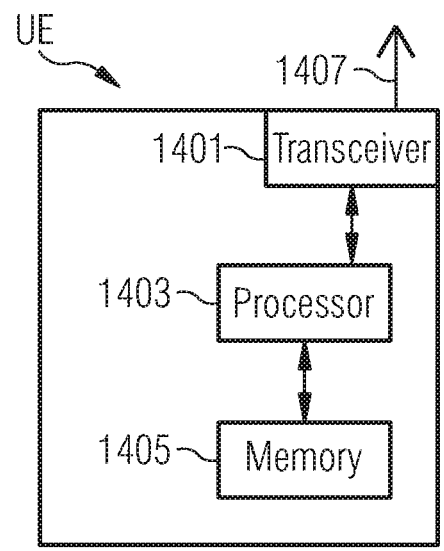
FIG. 14 is a block diagram illustrating a wireless device, UE, according to some embodiments of inventive concepts.

FIG. 14 is a block diagram illustrating elements of a wireless device UE (also referred to as a wireless terminal, a wireless communication device, a wireless communication terminal, user equipment, UE, a user equipment node/terminal/device, etc.) configured to provide wireless communication according to embodiments of inventive concepts. As shown, wireless device UE may include an antenna 1407, and a transceiver circuit 1401 (also referred to as a transceiver) including a transmitter and a receiver configured to provide uplink and downlink radio communications with a base station eNB (or gNB) of a wireless communication network (also referred to as a radio access network RAN). Wireless device UE may also include a processor circuit 1403 (also referred to as a processor) coupled to the transceiver circuit, and a memory circuit 1405 (also referred to as memory) coupled to the processor circuit. The memory circuit 1405 may include computer readable program code that when executed by the processor circuit 1403 causes the processor circuit to perform operations according to embodiments disclosed herein. According to other embodiments, processor circuit 1403 may be defined to include memory so that a separate memory circuit is not required. Wireless device UE may also include an interface (such as a user interface) coupled with processor 1403, and/or wireless device UE may be an IoT and/or MTC device.

As discussed herein, operations of wireless device UE may be performed by processor 1403 and/or transceiver 1401. For example, processor 1403 may control transceiver 1401 to transmit uplink communications through transceiver 1401 over a radio interface to a base station of a wireless communication network and/or to receive downlink communications through transceiver 1401 from a base station of the wireless communication network over a radio interface. Moreover, modules may be stored in memory 1405, and these modules may provide instructions so that when instructions of a module are executed by processor 1403, processor 1403 performs respective operations (e.g., operations discussed below with respect to Example Embodiments).

Figure 15:
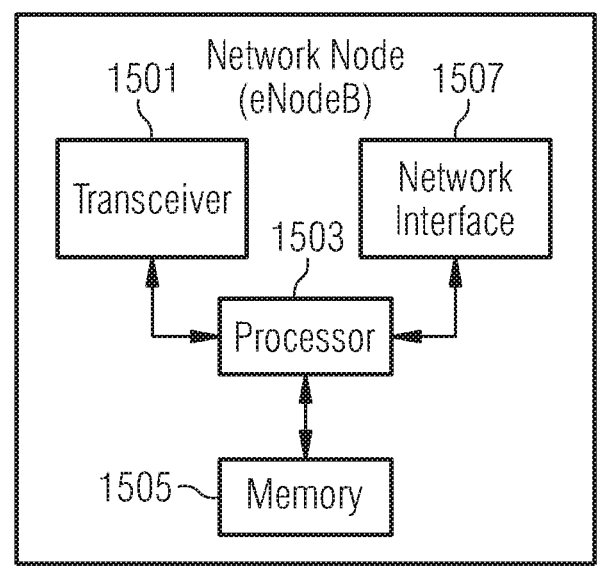
FIG. 15 is a block diagram illustrating a network node, eNB or gNB, according to some embodiments of inventive concepts.

FIG. 15 is a block diagram illustrating elements of an (access) node (also referred to as a base station, eNB, eNodeB, or gNB) of a wireless communication network (also referred to as a Radio Access Network RAN) configured to provide cellular communication according to embodiments of inventive concepts. As shown, the network node may include a transceiver circuit 1501 (also referred to as a transceiver) including a transmitter and a receiver configured to provide uplink and downlink radio communications with wireless devices. The network node may include a network interface circuit 1507 (also referred to as a network interface) configured to provide communications with other nodes (e.g., with other base stations and/or core network nodes) of the RAN. The network node may also include a processor circuit 1503 (also referred to as a processor) coupled to the transceiver circuit, and a memory circuit 1505 (also referred to as memory) coupled to the processor circuit. The memory circuit 1505 may include computer readable program code that when executed by the processor circuit 1503 causes the processor circuit to perform operations according to embodiments disclosed herein. According to other embodiments, processor circuit 1503 may be defined to include memory so that a separate memory circuit is not required.

As discussed herein, operations of the network node may be performed by processor 1503, network interface 1507, and/or transceiver 1501. For example, processor 1503 may control transceiver 1501 to transmit downlink communications through transceiver 1501 over a radio interface to one or more UEs and/or to receive uplink communications through transceiver 1501 from one or more UEs over a radio interface. Similarly, processor 1503 may control network interface 1507 to transmit communications through network interface 1507 to one or more other network nodes and/or to receive communications through network interface from one or more other network nodes. Moreover, modules may be stored in memory 1505, and these modules may provide instructions so that when instructions of a module are executed by processor 1503, processor 1503 performs respective operations (e.g., operations discussed below with respect to Example Embodiments).

When NB-IoT is used, there may be several PRBs deployed (multi-carrier operation) to serve mass deployment of NB-IoT devices. It may be important that the load is evenly balanced between all carriers, to not unnecessarily congest certain carriers. Carrier redirection may be used to provide load balancing. Currently, carrier redirection may not be available for use with EDT because redirection occurs at MSG4 (RRC Connection Setup message).

According to some embodiments of inventive concepts, a wireless device UE may be notified that the current carrier where it has triggered random access is loaded and that it should trigger random access or continue the rest of the random access procedure in a different carrier. Random access is triggered with the first message (MSG1) where UE indicates its intention to access the network for data transmission. The response to the message from the network for this message is the second message (MSG2). In the present disclosure, methods are described whereby it may be possible to convey the redirection information from the Msg2 MAC PDU RA response message RAR message. The RAR message may contain two RARs in response to one detected preamble, for redirection purpose of the RAR. The "re-direction" could be valid for subsequent Msg3 transmission and/or later Msg1 re-attempt (also referred to as restart).

According to some embodiments of inventive concepts, a faster random-access response may be provided. Instead of waiting for a Backoff timer to expire (which can be relatively large for NB-IoT devices), a wireless device UE can be re-directed, faster load balancing may be provided, and/or Network NW performance may be improved by recommending the wireless device UE with re-direction info (i.e., by load balancing).

There may be occasions when a wireless device UE does not receive a Random Access Response (RAR) for an RA preamble (msg1) it sent. Instead, the wireless device UE may be asked by the network NW to backoff (wait) for certain time based upon a backoff parameter before transmitting a next RA preamble (msg1) on the same carrier. The backoff parameter may be sent in RAR (msg2) and may be used to derive the timer which controls the time from the failed Random Access RA attempt until the next RA attempt is started. The wireless device UE applies the backoff timer when it receives a Backoff Indicator but no RAR corresponding to the sent RA preamble. In such cases, it may be beneficial to re-direct the wireless device UE to another carrier instead of the wireless device UE waiting before triggering the random access procedure again on the same carrier.

Figure 1:
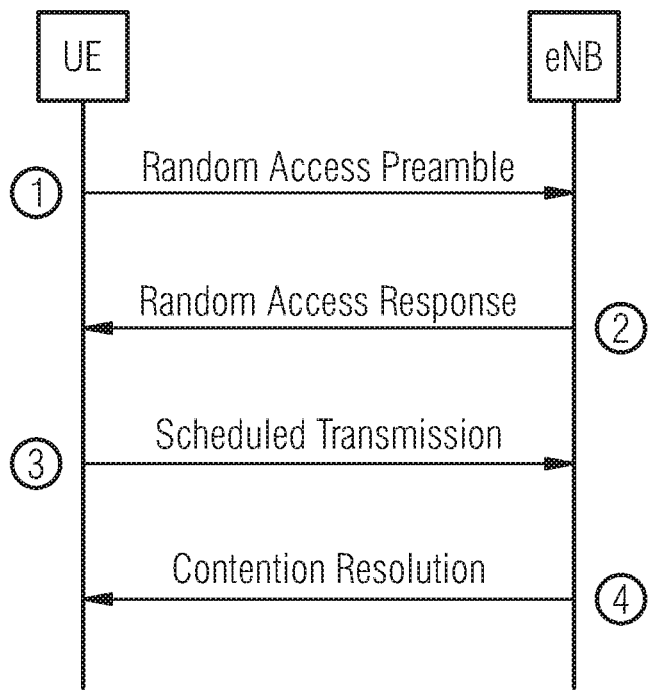
FIG. 1 is a message diagram illustrating operations of a random access procedure.
Figure 2:
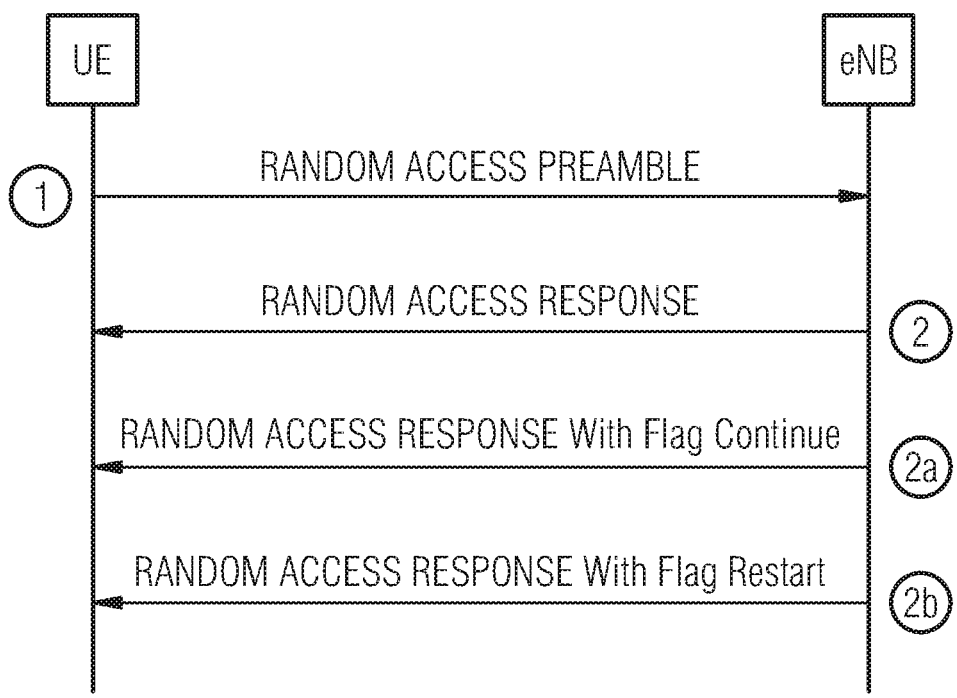
FIG. 2 is a message diagram illustrating alternative operations of a random access procedure according to some embodiments of inventive concepts.

According to some embodiments of inventive concepts, redirection may be provided by the network NW to the wireless device UE. As shown in FIG. 2, messages 1 and 2 (msg1 and msg2) may be performed conventionally whereby message 2 (msg2) provides scheduling information used by the wireless device UE to perform a message 3 (msg3) scheduled transmission as discussed above with respect to FIG. 1. In the event that a carrier being used for RA is congested, however, the base station may respond with a message 2a or a message 2b (instead of the message 2 msg2) as shown in FIG. 2 to redirect the wireless device to a different carrier than that used for the RA preamble of msg1.

In message 2a of FIG. 2, a flag may be used to indicate redirection of the wireless device UE to another carrier to be used to continue the RA procedure (e.g., without requiring transmission of another RA preamble msg1). Upon receiving the flag of message 2a, the wireless device UE may assume that it's Random Access PRACH preamble (of message 1) was successfully received by the base station. However, it should re-direct MSG3 to a new carrier. NW may optionally provide the new re-directed carrier information.

In message 2b of FIG. 2, a flag may be used to indicate redirection of the wireless device UE to another carrier to be used to restart the RA procedure (e.g., requiring transmission of a second RA preamble on the other carrier to initiate a new RA procedure). Upon receiving the flag of message 2b, the wireless device UE may assume that it's Random Access PRACH Procedure was un-successful (i.e., the wireless device UE did not find its RAR within the RA-window) and that it should use another carrier for the re-attempt. The wireless device UE may attempt msg1 (Random Access Preamble) on a new carrier. The network NW may optionally provide the new re-directed carrier information.

According to some embodiments of inventive concepts, all UE devices supporting EDT may support re-direction. In an alternative, the re-direction may be supported by new Release UEs (Rel-15 and higher) and may be decoupled from EDT capability. However, gains may be expected to be higher with EDT.

Note that any combination of messages 2a and 2b may be applied by the base station. For example, the base station may use a message 2b to simultaneously indicate all wireless devices UEs (e.g., all wireless devices in a group) which fail to find the RAR for the Msg1 preamble should carry out the re-attempt on another carrier, and use a message(s) to re-direct certain successful preambles ("UE-specific") to other carriers.

According to some embodiments herein, Rel-15 UEs that support EDT may also support early "re-direction" described herein with respect to messages 2a and 2b. For these wireless devices UEs, instead of backing off the wireless device UE for certain time, a "re-direction" can be performed. The "re-direction" can either be valid for the subsequent Msg3 transmission (e.g., as discussed above with respect to message 2a), or for a later Msg1 re-attempt if the UE does not find the RAR corresponding to its preamble (as discussed above with respect to message 2b), or it could apply to both. As used herein, a "re-direction" may be considered as guidance or as a recommendation to the wireless device UE in the case of Msg1 re-attempt, because the base station may not know if the wireless device UE follows the recommendation or not, and there may not be a way to test it since the UE_ID (wireless device identification) may not be known at the base station at the time of Msg2 transmission).

According to some embodiments of inventive concepts, two methods may be provided to notify the user that a carrier redirection is recommended in accordance with message 2b. A carrier redirection flag can be indicated either using one of the Reserved bits (R bits) in the medium access control MAC protocol data unit PDU subheader or using one of the reserved codepoints in the BackOff Parameter values table.

FIG. 3 illustrates an E/T/R/R/BI MAC subheader from 3GPP TS 36.321 v14.4.0. As shown in FIG. 3, this 8-bit (1 octet) subheader may include a 4-bit Backoff Indicator "BI" and two reserved bits "R." BI indices and corresponding backoff parameter values for the 4-bit BI are illustrated in in FIG. 5. As shown, BI indices 1-12 are used to indicate respective backoff parameter values ranging from 0ms to 960 ms, and BI indices 13-15 may be reserved/unused.

FIG. 4 illustrates an E/T/F/R/BI MAC subheader that may be used for message 2b according to some embodiments of inventive concepts. As shown in FIG. 4, one of the reserved bits "R" may be used as a flag bit "F" to indicate redirection. When the flag bit "F" is set to 1, wireless devices UEs supporting EDT may assume that a redirection is preferred by the network NW. In response to the flag bit "F" indicating redirection, the wireless device UE may either select another EDT carrier (i.e., an EDT carrier different than that used for the initial attempt) for the re-attempt, or the wireless device UE may further read the MAC RAR to determine the new EDT carrier it should use for the re-attempt. Optionally, the second reserved R-bit could be used to indicate whether the UE is recommended to make the access re-attempt on non-EDT resources.

Figures 6, 7:
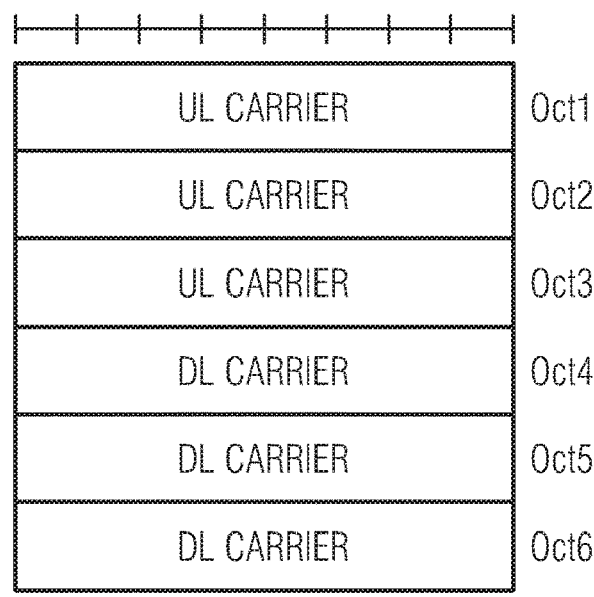
FIG. 6 is a table providing backoff parameter indices and corresponding backoff parameter values with one index being used to indicate redirection according to some embodiments of inventive concepts.
FIG. 7 illustrates a MAC RAR used to identify UL and DL carriers to be used for redirection according to some embodiments of inventive concepts.

According to some other embodiments of inventive concepts, a reserved backoff parameter index may be used as a flag to indicate redirection as shown in the table of FIG. 6 (instead of using flag bit "F" as shown in FIG. 4). As shown in FIG. 6, the backoff parameter index 13 may be used to indicate a redirection flag.

According to such embodiments, if the 'Redirection Flag' is indicated (either via a redirection flag bit "F" of FIG. 4 or via a dedicated backoff parameter index of FIG. 6), the wireless device UE may not have to apply any back-off time because the re-attempt will be on another carrier. In such cases, the wireless device UE may assume that the MAC RAR will have new format as shown in FIG. 7. The information of FIG. 7 may be provided in the RAR to signal the uplink and downlink carriers to be used for the RA redirection. The 3 UL carrier octets (24 bits) may be used to signal a 23 bit UL carrier identification to be used for the RA redirection, and the 3DL carrier octets (24 bits) may be used to signal a 23 bit DL carrier identification to be used for the RA redirection. When redirection is desired, the RAR may thus include the subheader of FIG. 4 (with redirection indicated by either a redirection flag bit or a redirection flag index) and identifications of the UL and DL carriers to be used for the RA reattempt. Per 3GPP TS 36.101 v15.1.0, the carrier frequency of category NB1 in the downlink is designated by the E-UTRA Absolute Radio Frequency Channel Number (EARFCN) in the range 0-262143 and the Offset of category NB1 Channel Number to EARFCN in the range {−10,−9,−8,−7,−6,−5,−4,−3,−2,−1,−0.5,0,1,2,3,4,5,6, 7,8,9}.

According to some embodiments discussed above with respect to FIGS. 4, 6, and 7, as for the Back-off indication, the re-direction carrier may not be UE-specific and may instead be applicable to all re-attempts for all wireless devices UEs that either do not find a RAR corresponding to their preamble or to wireless devices UEs that later fail contention resolution.

According to some embodiments of inventive concepts, irrespective of the Backoff timer, the network NW may indicate redirection to EDT wireless devices UEs. The MAC RAR of FIG. 8 may be provided in response to a RA preamble from a specific wireless device UE as indicated by the Temporary C-RNTI (Cell Radio Network Temporary Identifier) for the wireless device, and in response, the wireless device UE (corresponding to the C-RNTI) may continue the RA procedure on a new carrier without repeating the RA preamble transmission of msg1.

Figure 9:
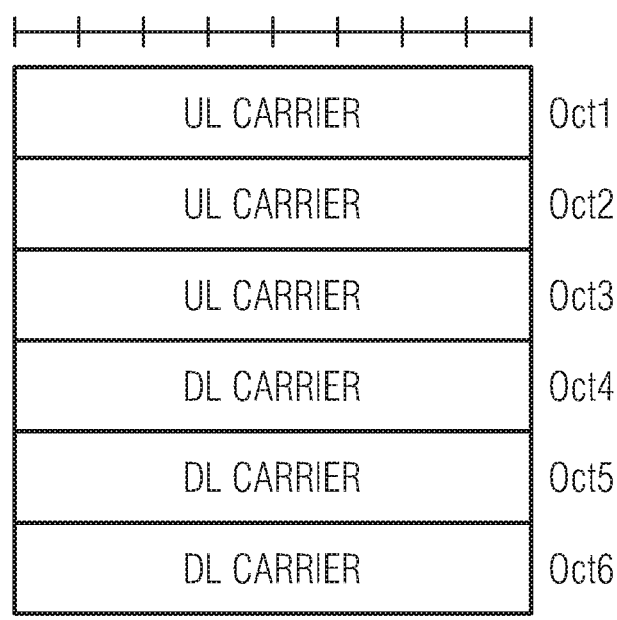
FIG. 9 illustrates a MAC RAR used to identify UL and DL carriers to be used for redirection according to some embodiments of inventive concepts.

In an RAR response message, an otherwise reserved R bit(s) may be used as a flag bit(s) "F" to indicate that the next MAC RAR includes the UL/DL carrier info. Thus, once the wireless device UE receives the RAR response message, the UE may realize that redirection should occur and/or that there will be a trailing MAC RAR PDU which contains the redirection UL and DL carrier information to be used to continue the RA procedure. Such a redirection flag "F" may be used to indicate that redirection should occur (e.g., "F"=1) and that a trailing MAR RAR PDU contains redirection UL and DL carrier information (shown in FIG. 9) to be used to continue the RAR procedure after redirection. In FIG. 9, the 3 UL carrier octets (24 bits) may be used to signal a 23 bit UL carrier identification to be used for the RA redirection, and the 3 DL carrier octets (24 bits) may be used to signal a 23 bit DL carrier identification to be used for the RA redirection.

Figure 8:
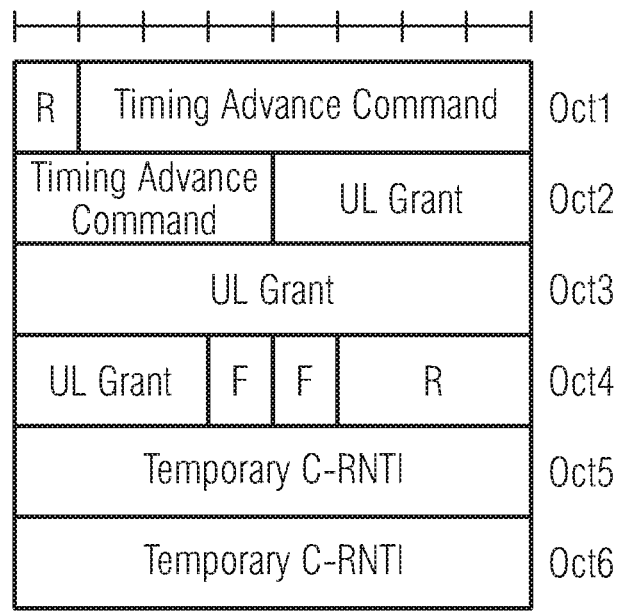
FIG. 8 illustrates a MAC RAR including at least one flag bits used to indicate redirection according to some embodiments of inventive concepts.

As shown in FIG. 8, the MAC RAR for re-direction may use multiple redirection flag bits "F" (otherwise reserved bits) to communicate a redirection flag index as shown in the table of FIG. 10. For example, the wireless device UE may complete the RA procedure on the current carrier(s) according to legacy operation when the MAC RAR includes the index 00; redirection with continue may be performed when the MAC RAR includes the index 01 (where the NW provides the associated UL/DL carrier/carriers); and a new UL/DL carrier may be used when the MAC RAR includes the index 10. For a restart case, the wireless device UE may retransmit the RA preamble randomly trying another carrier, or the NW may provide the associated UL/DL carrier/carriers.

FIG. 11 illustrates an example of a MAC PDU including a MAC header and MAC RARs according to some embodiments of inventive concepts.

Thus, if the subheader of FIG. 12 is included in the MAC header of the MAC PDU of FIG. 11, then MAC RAR1 may include UL/DL carrier information as discussed above with respect to FIG. 9.

Figure 13:
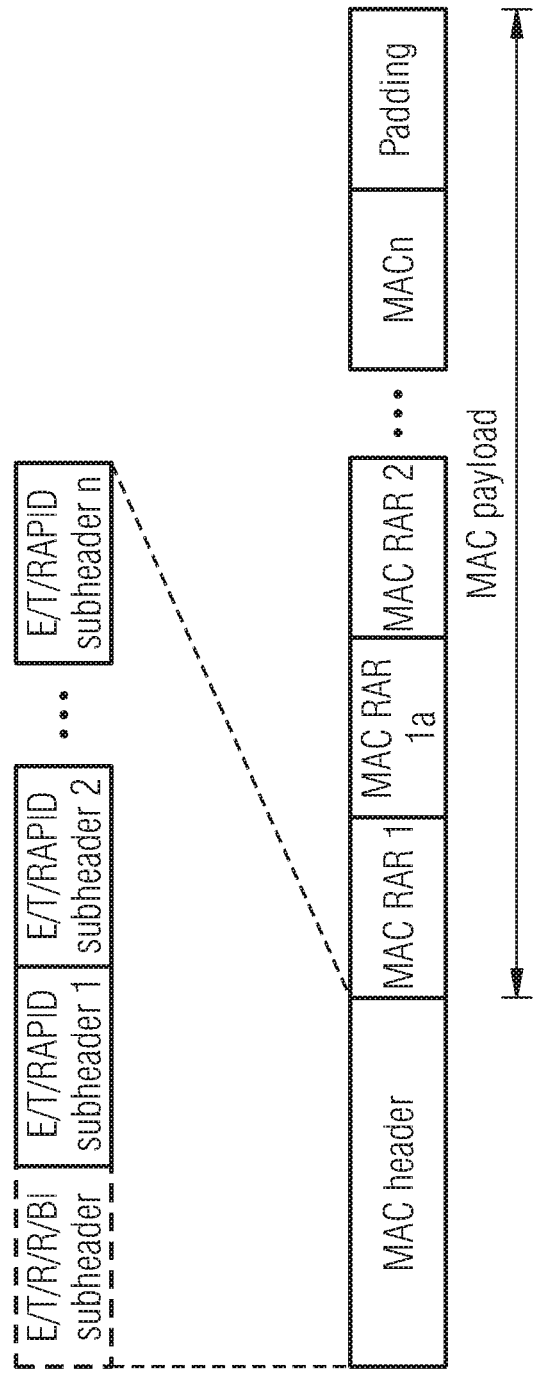
FIG. 13 illustrates a MAC PDU including a MAC RAR 1a according to some embodiments of inventive concepts.

As shown in FIG. 13, if the MAC RAR1 includes a new Flag (e.g., according to the structure of FIG. 8), there will be new MAC RAR containing UL/DL carrier info. As shown in FIG. 13, the new MAC RAR containing UL/DL carrier information may be provided as MAC RAR1a between MAC RAR1 and MAC RAR2.

According to some other embodiments, the new re-direction RAR may instead be provided in the padding region of FIG. 13 (e.g., not to confuse any legacy UEs which may not understand the new format). That is, if the presence of a new re-direction RAR is indicated in any of the ways suggested above, EDT wireless devices UEs may assume there is one more RAR after the last RAR indicated by the MAC sub-headers. That is, after the E-bit in the subheader has been set to 0. Legacy UEs (non-EDT UEs) may then consider this to be padding according the 3GPP TS 36.321 specification text quoted below and would not attempt to decode the new RAR which could otherwise cause problems.

E: The Extension field is a flag indicating if more fields are present in the MAC header or not. The E field is set to "1" to indicate at least another set of E/T/RAPID fields follows. The E field is set to "0" to indicate that a MAC RAR or padding starts at the next byte.

A re-direction indication as discussed above may be defined to apply to subsequent Msg3 transmissions, to Msg1 re-attempts, or both. This could either be hard coded in specifications, or flexibly configured using a system information broadcast. For the case of subsequent Msg3 transmissions, both wireless devices UEs that win the contention resolution and wireless devices UEs that lose the contention resolution may follow this direction. As discussed above, only one re-direction RAR may be specified such that all UEs will follow the same indication. In such embodiments, either all refrain from using the current carrier (random reselection excluding the current carrier) or all will be re-directed to the same other carrier. In a generalization above, separate re-direction indications could be provided for different preambles, and/or separate re-direction indications could be provided for subsequent Msg3 transmission and Msg1 retransmission.

Re-direction methods discussed above may be easier to introduce with EDT functionality and may provide flexibility for the EDT feature. An advantage to using such redirection with EDT may be that it is possible to identify from the PRACH Partition whether the wireless device UE is an EDT UE or a legacy UE, and thus, the network NW can decide whether to use early re-direction or not. In addition, new ways of indicating explicit support of early re-direction may be realized and thus inventive concepts herein may be applied to cases other than the EDT.

According to some embodiments of inventive concepts, a mechanism for early redirection may be provided in a random access procedure to provide load balancing and/or to improve performance.

Operations of a wireless device UE will now be discussed with reference to the flow chart of FIG. 16 according to some embodiments of inventive concepts. For example, modules may be stored in wireless terminal memory 1405 of FIG. 14, and these modules may provide instructions so that when the instructions of a module are executed by wireless device processor 1403, processor 1403 performs respective operations of the flow chart of FIG. 16.

Wireless device UE may be initially configured with a first UL carrier for random access and a first DL carrier for random access. At block 1601, wireless terminal processor 1403 may generate data for uplink transmission at block 1601, and upon generation of such data, processor 1403 may provide the data to an uplink buffer for the wireless device UE at block 1603. Responsive to providing the data for uplink transmission, processor 1403 may transmit a random access RA preamble of a RA procedure through transceiver 1401 to a base station, eNB (or gNB), of the wireless communication network at block 1605 using the first UL carrier.

At block 1607, processor 1403 may wait for a Random Access Response RAR, and at block 1608, processor 1403 may receive the RAR from the base station eNB through transceiver 1401 using the first DL carrier. Depending on information provided in the RAR, the wireless terminal may either restart the RA procedure with redirection, continue with the RA procedure with redirection, or continue with the RA procedure (or restart the RA procedure) without redirection.

At block 1608, the RAR may include an indication to restart the RA procedure using a second UL carrier (different than the first UL carrier) and a second DL carrier (different than the first DL carrier) for the RA procedure, and the RAR may include an identification of the second uplink carrier and an identification of a second downlink carrier. In this case, the RAR may include a flag to indicate a restart as discussed above with respect to the MAC subheader of FIG. 4 (e.g., a backoff indicator octet with a flag bit "F" set to provide the indication to restart the RA procedure) and/or a backoff parameter index (e.g., having a value greater than 12, such as a value of 13) set to provide indication to restart the RA procedure as discussed above with respect to the table of FIG. 6. In addition, the RAR may include identifications of the second UL carrier and the second DL carrier as discussed above with respect to FIG. 7.

Responsive to the RAR including the indication to restart the RA procedure with redirection, processor 1403 may proceed though decision blocks 1609 and 1615 to transmit a second RA preamble of the RA procedure through transceiver 1401 to base station eNB at block 1617 using the second UL carrier. After transmitting the second RA preamble of the RA procedure, processor 1403 may receive a second RAR of the RA procedure through transceiver 1401 from the base station eNB at block 1619 using the second DL carrier. Moreover, the second RAR may include an identification (e.g., a temporary identification, such as a C-RNTI) for the wireless device UE and an uplink grant. At block 1621, processor 1403 may transmit a scheduled uplink communication of the RA procedure through transceiver 1401 to the base station eNB of the wireless communication network based on the uplink grant from the second RAR. In addition, the scheduled uplink communication may include the data for uplink transmission from block 1603. In addition, processor 1401 may receive a contention resolution message through transceiver 1401 from the base station eNB at block 1623.

In an alternative, the RAR at block 1608 may include an indication to continue the RA procedure using a second uplink carrier different than the first uplink carrier and using a second DL carrier different than the first DL carrier, and the RAR may include an identification of the second uplink carrier and an identification of a second downlink carrier. In this case, the RAR may include the MAC RAR of FIG. 8 with a flag or index set to indicate continuation of the RA procedure with redirection (i.e., using different UL/DL carriers), an identification of the wireless device (e.g., a temporary identifier, such as a C-RNTI), and an uplink grant (UL grant). In addition, the RAR may include identifications of the second UL carrier and the second DL carrier as discussed above with respect to FIG. 9.

Responsive to the RAR of block 1608 including the indication to continue the RA procedure with redirection, processor 1403 may proceed through blocks 1609 and 1615 to transmit a scheduled uplink communication of the RA procedure through transceiver 1401 to the base station eNB of the wireless communication network at block 1611 based on the uplink grant from the RAR. Moreover, the scheduled uplink grant of block 1611 may include the data of block 1603 for uplink transmission. In addition, processor 1403 may receive a contention resolution message through transceiver 1401 from the base station eNB at block 1613.

For a given RA procedure for which redirection is indicated at block 1609, either processor 1403 may restart the RA procedure using new UL/DL carriers for operations 1617, 1619, 1621, and 1623, or processor 1403 may continue the RA procedure using new UL/DL carriers for operations 1611 and 1613. In addition, processor 1403 may initiate a next RA procedure at blocks 1601, 1603, and 1605 using the new (i.e., second) UL/DL carriers received through the RAR.

Responsive to the RAR of block 1608 not including an indication for redirection at block 1609, processor 1403 may continue with the RA procedure using the first UL/DL carriers. In response to the RAR including the MAC subheader of FIG. 3 with a backoff parameter index of FIG. 5 (e.g., having a value from 0 to 12), processor 1403 may determine at block 1624 that the RA procedure should be restarted at block 1605 using the first UL/DL carriers. In response to the RAR including an uplink grant and an address for the wireless device UE (e.g., a C-RNTI), processor 1403 may continue the RA procedure at blocks 1625 and 1627 using the first UL/DL carriers.

Figure 16:
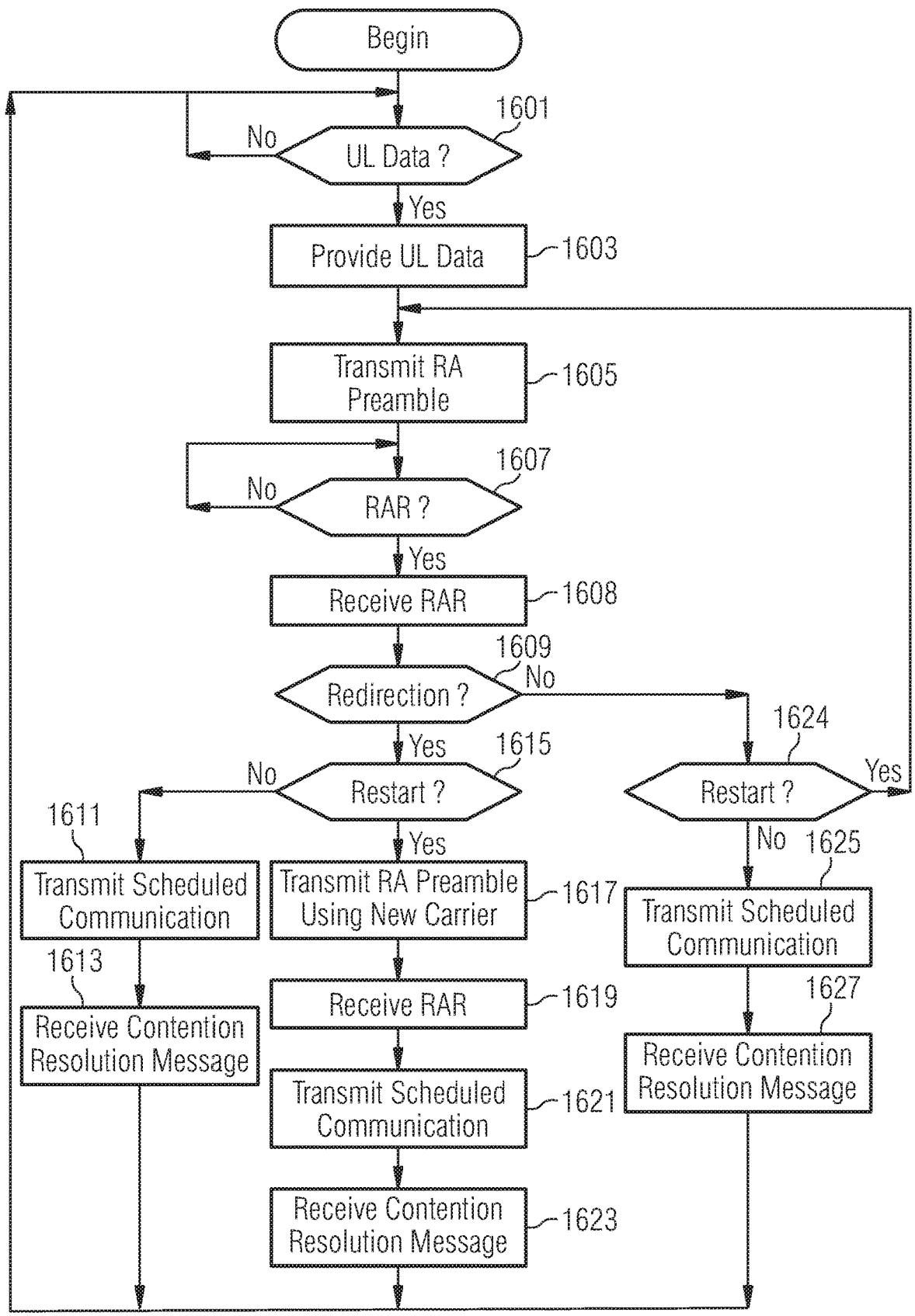
FIG. 16 is a flow chart illustrating operations of a wireless device according to some embodiments of inventive concepts.

Various operations of FIG. 16 may be optional with respect to some embodiments of wireless devices and related methods. Regarding methods of example embodiment 1 (set forth below), for example, operations of blocks 1601, 1603, 1607, 1609, 1611, 1613, 1615, 1617, 1619, 1621, 1623, 1624, 1625, and 1627 of FIG. 16 may be optional.

Operations of a base station eNB will now be discussed with reference to the flow chart of FIG. 17. For example, modules may be stored in base station memory 1505 of FIG. 15, and these modules may provide instructions so that when the instructions of a module are executed by processor 1503, processor 1503 performs respective operations of the flow chart of FIG. 17.

As discussed above with respect to FIG. 16, a wireless device UE may be initially configured with a first UL carrier and a first DL carrier for random access, and the wireless device UE may initiate a random access RA procedure by transmitting an RA preamble using the first UL carrier. In response to such an RA preamble, base station processor 1503 may receive the RA preamble from the wireless device UE through transceiver 1501 using the firsts UL carrier at block 1703. In addition, processor 1503 may determine a level of congestion of UL/DL carriers used for random access at block 1705. The determination of congestion may be used by processor 1503, for example, to determine whether to redirect the random access procedure to other UL/DL carriers and/or whether to continue/restart the random access procedure.

At block 1707, processor 1503 may determine whether to redirect the wireless terminal UE to different UL/DL carriers for random access, and if redirection is selected at block 1707, processor 1503 may determine at block 1709 whether to restart or continue the random access procedure. Processor 1503 may determine outcomes of decision blocks 1707 and 1709 based on the congestion of RA UL/DL carriers determined at block 1705.

Responsive to selecting redirection at block 1707 and selecting restart at block 1709, processor 1503 may transmit a Random Access Response RAR of the RA procedure through transceiver 1501 to the wireless device UE at block 1711, with the RAR including an indication to restart the RA procedure using a second UL carrier and a second DL carrier for the RA procedure. The RAR may include the indication to restart the RA procedure using a second UL carrier (different than the first UL carrier) and a second DL carrier (different than the first DL carrier) for the RA procedure, and the RAR may include an identification of the second uplink carrier and an identification of a second downlink carrier. In this case, the RAR may include a flag to indicate a restart as discussed above with respect to the MAC subheader of FIG. 4 (e.g., a backoff indicator octet with a flag bit "F" set to provide the indication to restart the RA procedure) and/or a backoff parameter index (e.g., having a value greater than 12, such as a value of 13) set to provide indication to restart the RA procedure as discussed above with respect to the table of FIG. 6. In addition, the RAR may include identifications of the second UL carrier and the second DL carrier as discussed above with respect to FIG. 7. Such an RAR may apply to operations of a group of wireless devices attempting random access.

At block 1713, processor 1503 may receive a second RA preamble of the RA procedure from the wireless device UE using the second uplink carrier after transmitting the first RAR at block 1711. At block 1715, processor 1503 may transmit a second RAR of the RA procedure through transceiver 1501 to the wireless device UE using the second DL carrier responsive to the second RA preamble, with the second RAR including an identification (e.g., a temporary identification such as a C-RNTI) for the wireless device UE and an uplink grant. At block 1717, processor 1503 may receive a scheduled uplink communication of the RA procedure from the wireless device UE through transceiver 1501 based on the uplink grant from the second RAR. In addition, processor 1503 may transmit a contention resolution message through to the wireless device UE.

In an alternative, processor 1503 may select redirection at block 1707 while continuing with the RA procedure at block 1709. In this case, processor 1503 may transmit a Random Access Response RAR of the RA procedure through transceiver 1501 to the wireless device UE at block 1721, with the RAR including an indication to use a second uplink carrier different than the first uplink carrier, including an identification of the wireless device, and including an uplink grant. In this case, the RAR may include the MAC RAR of FIG. 8 with a flag or index set to indicate continuation of the RA procedure with redirection (i.e., using different UL/DL carriers), an identification of the wireless device (e.g., a temporary identifier, such as a C-RNTI), and an uplink grant (UL grant). In addition, the RAR may include identifications of the second UL carrier and the second DL carrier as discussed above with respect to FIG. 9.

At block 1723, processor 1503 may receive a scheduled uplink communication of the RA procedure from the wireless device UE through transceiver 1501 based on the uplink grant from the RAR. IN addition, processor 1503 may transmit a contention resolution message through transceiver 1501 to the wireless device UE at block 1725.

Responsive to processor 1503 determining at block 1707 that redirection is not desired, processor may proceed with the RA procedure using the first UL/DL carriers for the RA procedure. If the RA procedure should continue (not restart) at block 1731, processor may transmit an RAR with a UL grant and an identifier (e.g., C-RNTI) for the wireless device UE through transceiver 1501 to the wireless device UE using the first DL carrier at block 1733. At block 1734, processor 1503 may receive a scheduled UL communication from wireless device UE through transceiver 1501 based on the UL grant of block 1733. At block 1735, processor 1503 may transmit a contention resolution message through transceiver 1501 to the wireless device UE. In an alternative, processor 1503 may decide at block 1731 to restart the RA procedure for the wireless terminal UE (or a group of wireless terminals) by transmitting an RAR through transceiver 1501 to wireless device UE, with the RAR including the MAC subheader of FIG. 3 with a backoff parameter index of FIG. 5 (e.g., having a value from 0 to 12).

Figure 17:
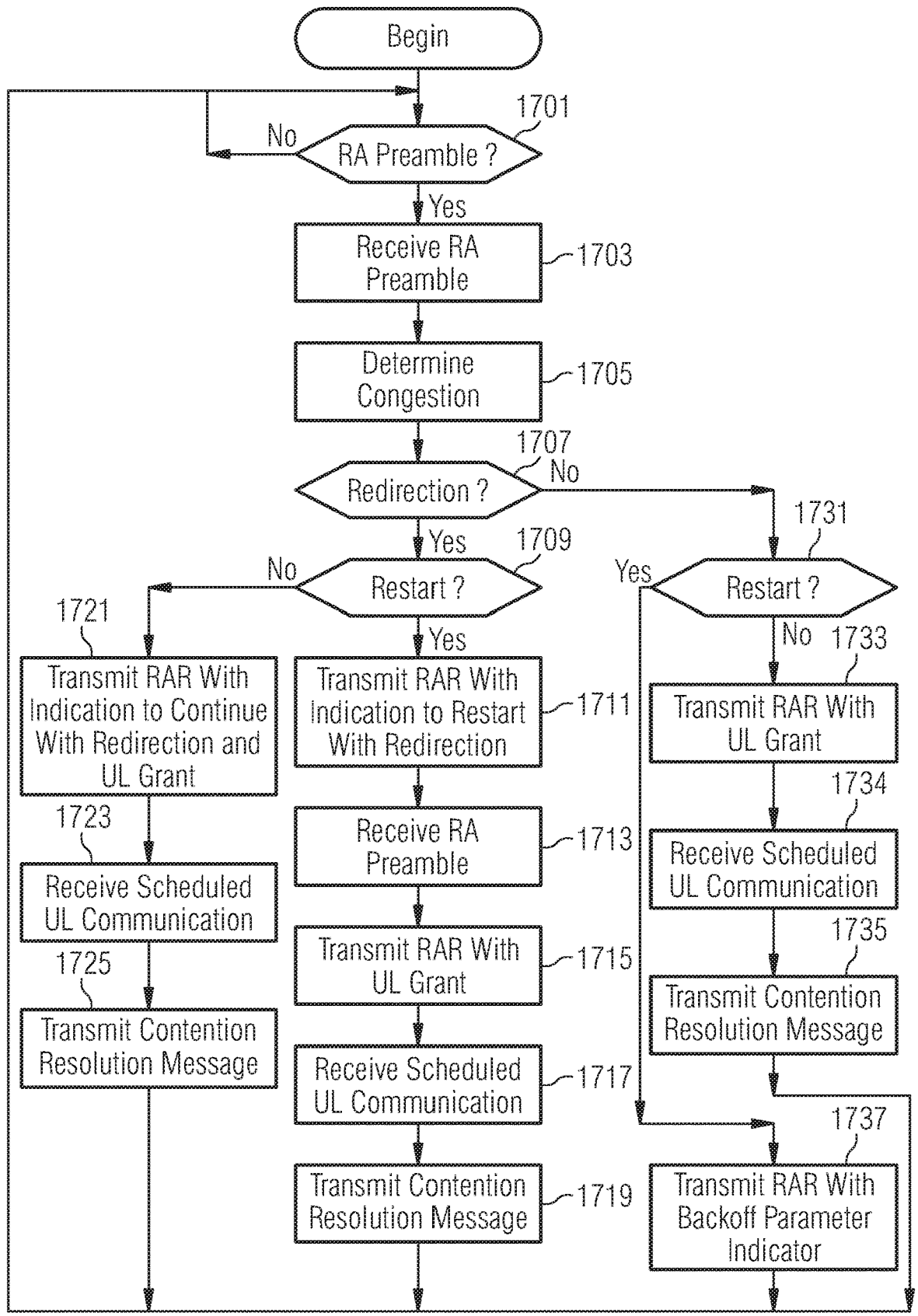
FIG. 17 is a flow chart illustrating operations of a base station according to some embodiments of inventive concepts.

Various operations of FIG. 17 may be optional with respect to some embodiments of base stations and related methods. Regarding methods of example embodiment 14 (set forth below), for example, operations of blocks 1701, 1705, 1707, 1709, 1713, 1715, 1717, 1719, 1723, 1725, 1731, 1733, 1734, 1735, and/or 1737 of FIG. 17 may be optional.

Figure 18:
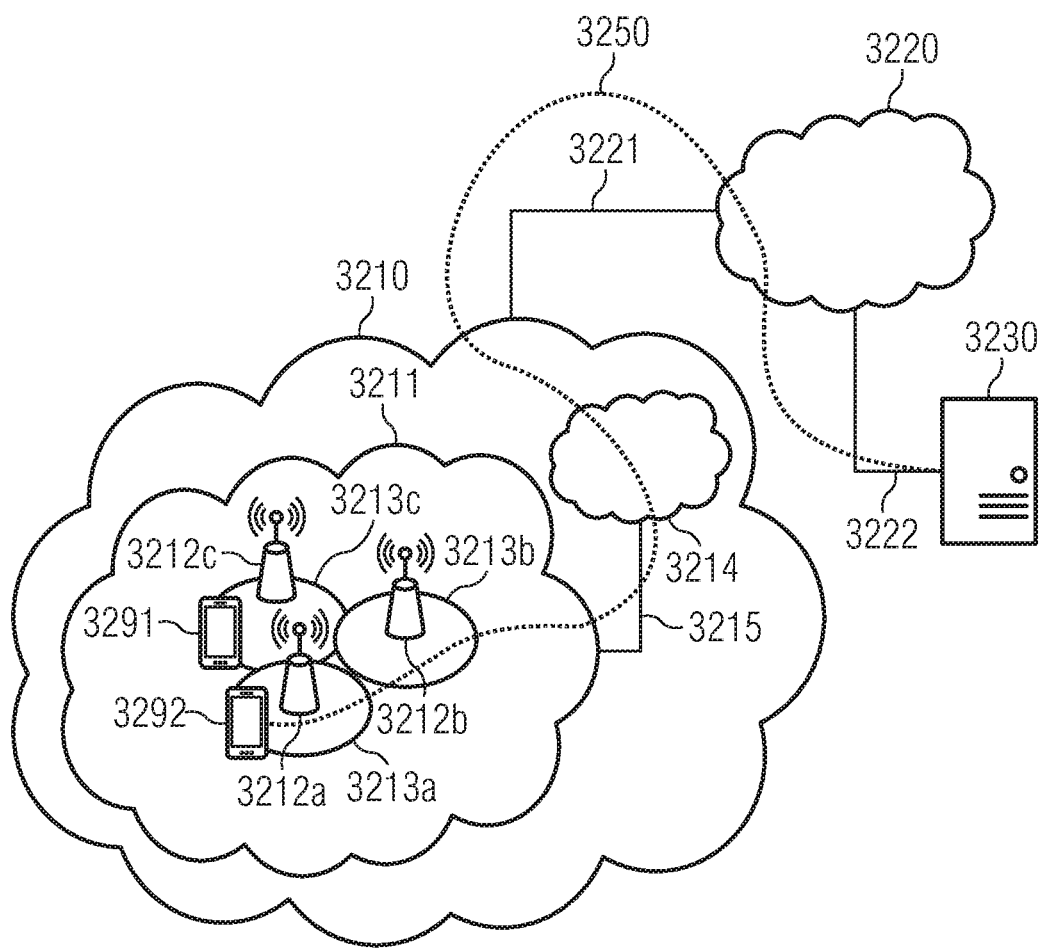
FIG. 18 schematically illustrates a telecommunication network connected via an intermediate network to a host computer.

With reference to FIG. 18, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 18 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 19. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 19) served by the base station 3320. The communication interface 3326 may be configured to facilitate a connection 3360 to the host computer 3310. The connection 3360 may be direct or it may pass through a core network (not shown in FIG. 19) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 19:
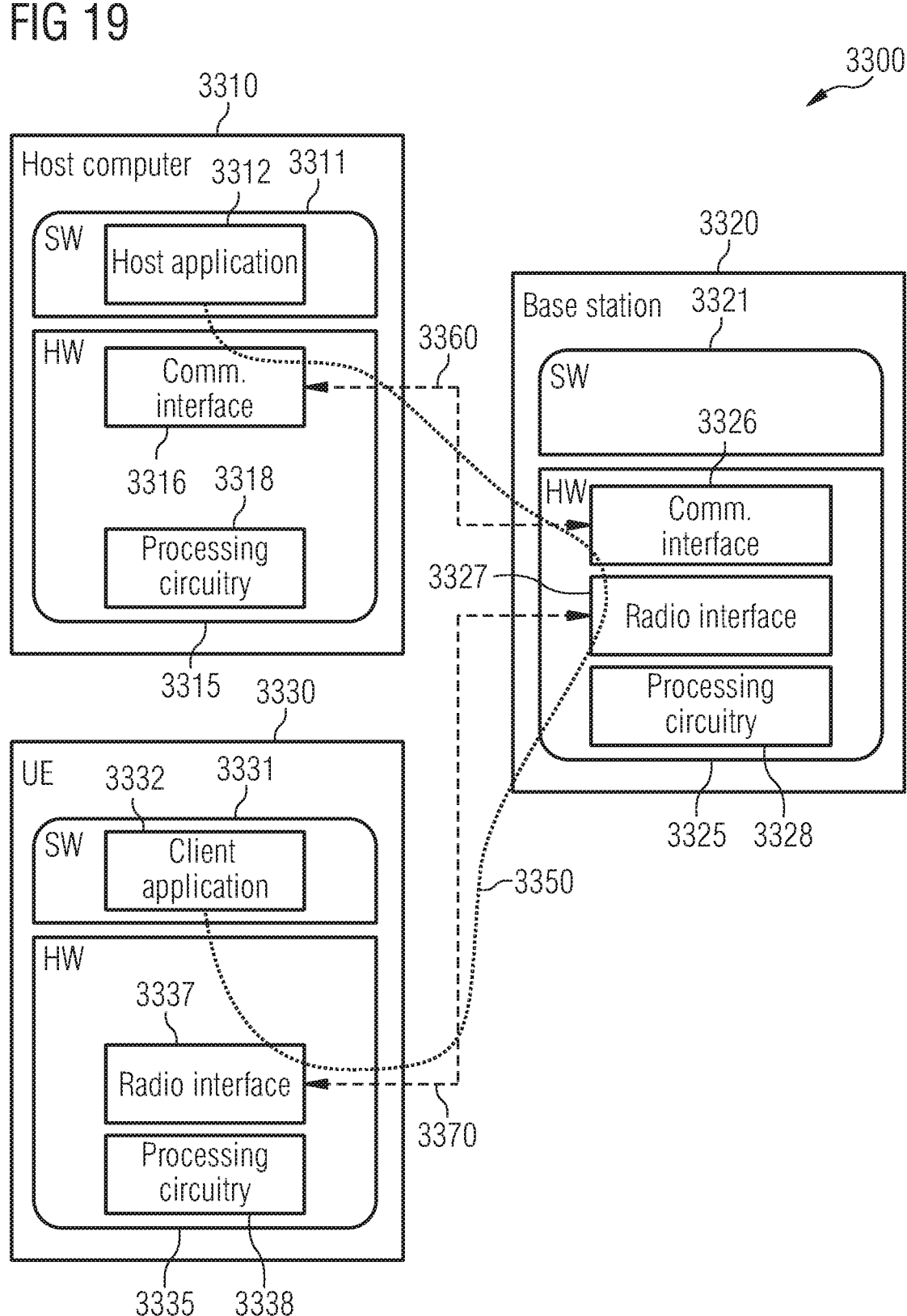
FIG. 19 is a generalized block diagram of a host computer communicating via a base station with a user equipment over a partially wireless connection.

It is noted that the host computer 3310, base station 3320 and UE 3330 illustrated in FIG. 19 may be identical to the host computer 3230, one of the base stations 3212a, 3212b, 3212c and one of the UEs 3291, 3292 of FIG. 18, respectively. This is to say, the inner workings of these entities may be as shown in FIG. 19 and independently, the surrounding network topology may be that of FIG. 18.

In FIG. 19, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 20:
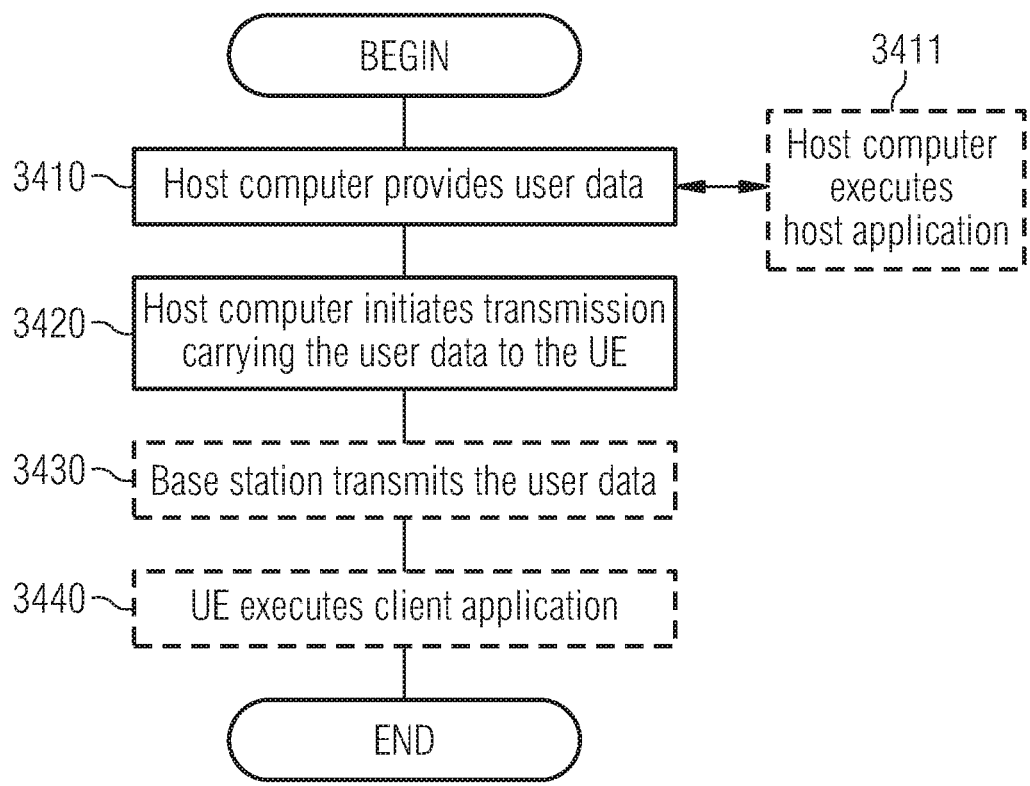
FIGS. 20 to 23 are flowcharts illustrating methods implemented in a communication system including a host computer, a base station and a user equipment.
Figure 21:
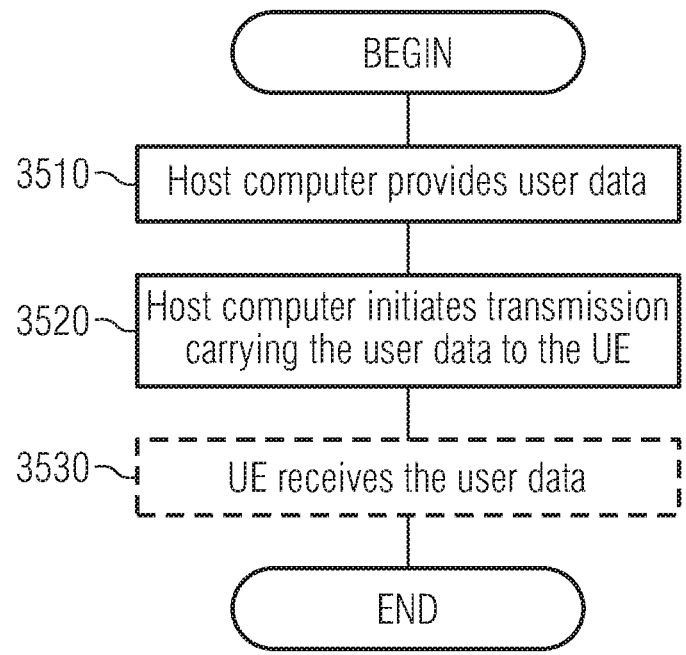
Figure 22:
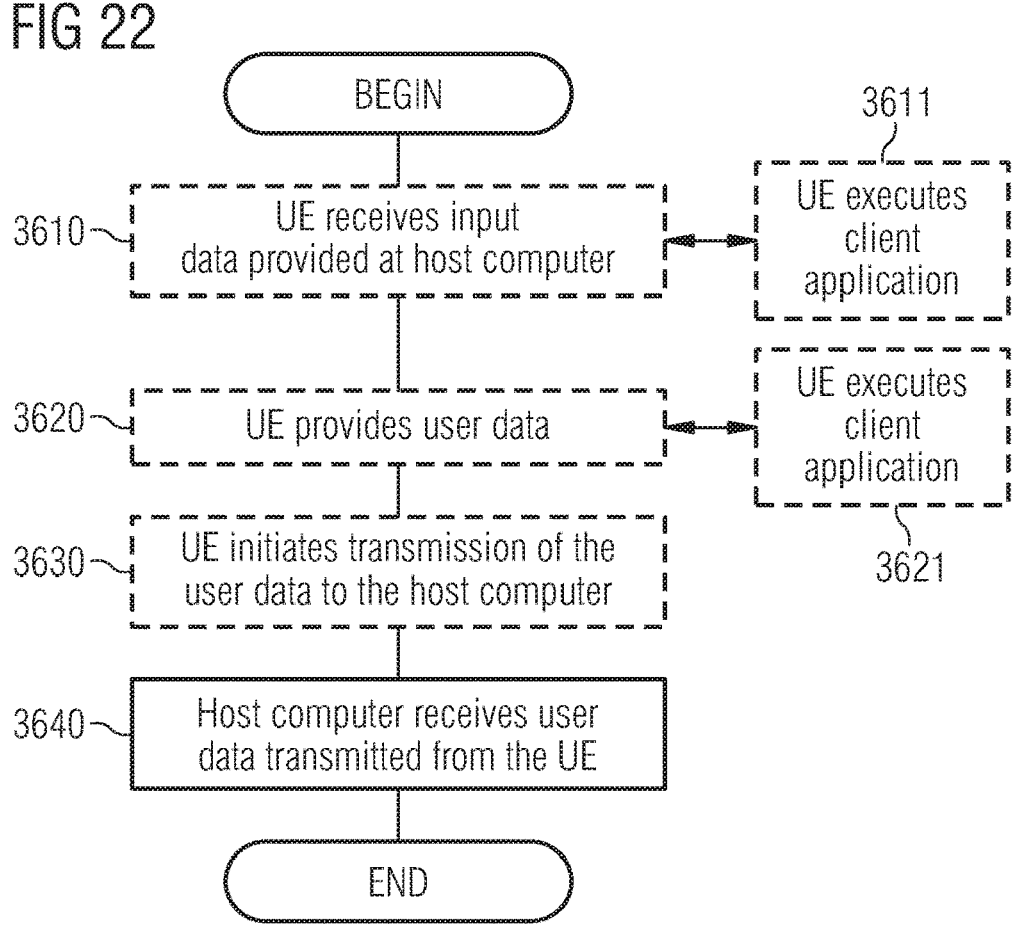
Figure 23:
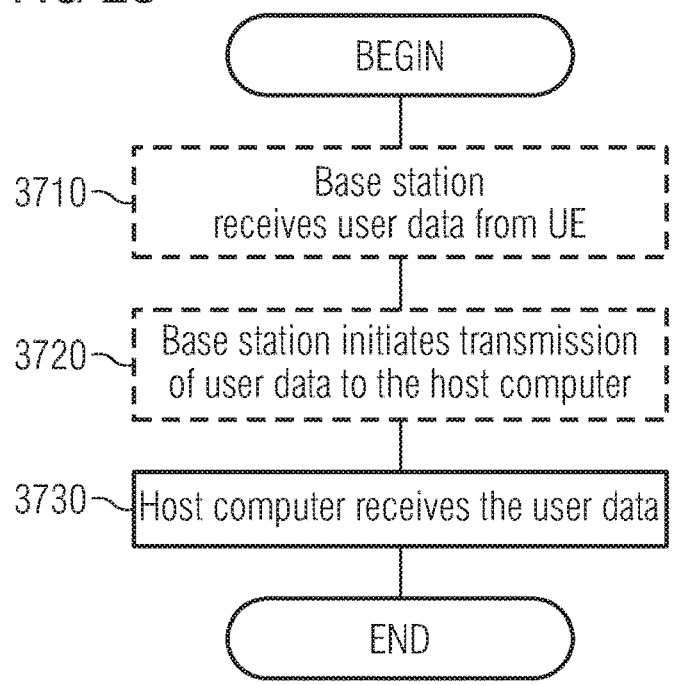

FIGS. 20 and 21 and the corresponding text are about a downstream aspect of the radio-related invention, while FIGS. 22 and 23 and the corresponding text discuss an upstream aspect. If only one aspect is applicable for an invention, then, because the text and drawings are self-contained for each aspect, the text and drawings for the other aspect may be omitted without disadvantage.

FIG. 20 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 20 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 21 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 21 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 22 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 22 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 23 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 23 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

The invention claimed is:

1. A method of operating a wireless device, UE, configured to provide communication over a radio interface with a wireless communication network, the method comprising:
  transmitting a random access, RA, preamble of an RA procedure to the wireless communication network using a first uplink carrier;
  after transmitting the RA preamble of the RA procedure, receiving a Random Access Response, RAR, of the RA procedure from the wireless communication network, the RAR including an indication to use a second uplink carrier different than the first uplink carrier and an uplink grant, the indication indicating that a subsequent RAR includes an identification of the second uplink carrier, the subsequent RAR being received without repeating the RA preamble transmission, a reserved bit in a Medium Access Control, MAC, subheader being used as a flag bit for the indication, and a second reserved bit in the MAC subheader being used to indicate whether the UE is to continue the RA procedure on non-early data transmission resources; and
  continuing the RA procedure to perform a scheduled uplink transmission with the second uplink carrier based on the uplink grant, the scheduled uplink transmission being early data transmission.

2. The method of claim 1 further comprising:
  providing data at the wireless device for uplink transmission;
  wherein transmitting the RA preamble comprises transmitting the RA preamble responsive to providing the data for uplink transmission;
  wherein the scheduled uplink communication includes the data for uplink transmission.

3. The method of claim 1, wherein the RAR includes an identification of the second uplink carrier.

4. The method of claim 1, wherein receiving the RAR comprises receiving the RAR using a first downlink carrier, and wherein the RAR includes an identification of a second downlink carrier different than the first downlink carrier.

5. A method of operating a base station of a wireless communication network configured to provide communication over a radio interface with a wireless device, UE, the method comprising:
  receiving a random access, RA, preamble of an RA procedure from the wireless device using a first uplink carrier;
  responsive to receiving the RA preamble of the RA procedure, transmitting a Random Access Response, RAR, of the RA procedure to the wireless device, the RAR including an indication to use a second uplink carrier different than the first uplink carrier and an uplink grant, the indication indicating that a subsequent RAR includes an identification of the second uplink carrier, the subsequent RAR being transmitted without receiving a repeated RA preamble transmission, a reserved bit in a Medium Access Control, MAC, subheader being used as a flag bit for the indication, and a second reserved bit in the MAC subheader being used to indicate whether the UE is to continue the RA procedure on non-early data transmission resources; and
  receiving a scheduled uplink transmission with the second uplink carrier in response to the uplink grant, the scheduled uplink transmission being an early data transmission transmitted using non-early data transmission resources.

6. The method of claim 5, wherein the indication comprises an indication to continue the RA procedure using the second uplink carrier different than the first uplink carrier.

7. The method of claim 6, wherein the RAR includes an identification for the wireless device and an uplink grant, the method further comprising:
  receiving a scheduled uplink communication of the RA procedure from the wireless device based on the uplink grant from the RAR.

8. The method of claim 5, wherein the RAR includes an identification of the second uplink carrier.

9. The method of claim 8, wherein transmitting the RAR comprises transmitting the RAR using a first downlink carrier, and wherein the RAR includes an identification of a second downlink carrier different than the first downlink carrier.

10. The method of claim 9, wherein transmitting the RAR comprises transmitting the RAR including the indication to use the second uplink carrier responsive to congestion on the first uplink carrier and/or on the first downlink carrier.

11. A wireless device, UE, comprising:
  a transceiver configured to provide wireless network communication with a wireless communication network; and a processor coupled with the transceiver, the processor being configured to provide wireless network communication through the transceiver, and the processor being configured to:
    transmit a random access, RA, preamble of an RA procedure to the wireless communication network using a first uplink carrier;
    after transmitting the RA preamble of the RA procedure, receive a Random Access Response, RAR, of the RA procedure from the wireless communication network, the RAR including an indication to use a second uplink carrier different than the first uplink carrier and an uplink grant, the indication indicating that a subsequent RAR includes an identification of the second uplink carrier, the subsequent RAR being received without repeating the RA preamble transmission, a reserved bit in a Medium Access Control, MAC, subheader being used as a flag bit for the indication, and a second reserved bit in the MAC subheader being used to indicate whether the UE is to continue the RA procedure on non-early data transmission resources; and
    continue the RA procedure to perform a scheduled uplink transmission with the second uplink carrier based on the uplink grant, the scheduled uplink transmission being early data transmission.

12. A base station of a wireless communication network, the base station comprising:
    a transceiver configured to provide wireless network communication with a wireless terminal; and
    a processor coupled with the transceiver, the processor being configured to provide wireless network communication through the transceiver, and the processor being configured to:
    receive a random access, RA, preamble of an RA procedure from the wireless device using a first uplink carrier;
    responsive to receiving the RA preamble of the RA procedure, transmit a Random Access Response, RAR, of the RA procedure to the wireless device, the RAR including an indication to use a second uplink carrier different than the first uplink carrier and an uplink grant, a reserved bit in a Medium Access Control, MAC, subheader being used as a flag bit for the indication, the indication indicating that a subsequent RAR includes an identification of the second uplink carrier, the subsequent RAR being transmitted without receiving a repeated RA preamble transmission, and a second reserved bit in the MAC subheader being used to indicate whether the UE is to continue the RA procedure on non-early data transmission resources; and
    receive a scheduled uplink transmission with the second uplink carrier in response to the uplink grant, the scheduled uplink transmission being an early data transmission transmitted using non-early data transmission resources.

\* \* \* \* \*